US008280371B2

(12) United States Patent
Yasumi et al.

(10) Patent No.: US 8,280,371 B2
(45) Date of Patent: Oct. 2, 2012

(54) BASE STATION AND RECEIVER FAILURE DIAGNOSING METHOD

(75) Inventors: Tatsuro Yasumi, Chigasaki (JP); Kei Fujiwara, Yamato (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 750 days.

(21) Appl. No.: 12/485,536

(22) Filed: Jun. 16, 2009

(65) Prior Publication Data

US 2010/0056134 A1    Mar. 4, 2010

(30) Foreign Application Priority Data

Sep. 1, 2008   (JP) ................................ 2008-223444

(51) Int. Cl.
*H04W 24/00* (2009.01)

(52) U.S. Cl. .................... 455/424; 455/63.1; 455/67.13; 455/570; 455/114.2; 455/423; 455/456.4; 455/561; 455/562.1

(58) Field of Classification Search .................. None
See application file for complete search history.

(56) References Cited

U.S. PATENT DOCUMENTS

| 6,442,398 | B1 * | 8/2002 | Padovani et al. | 455/522 |
| 2004/0203960 | A1 * | 10/2004 | Nagato et al. | 455/466 |
| 2005/0013283 | A1 * | 1/2005 | Yoon et al. | 370/350 |

FOREIGN PATENT DOCUMENTS

| JP | 2002-246978 | 8/2002 |
| JP | 2006-319616 | 11/2006 |

* cited by examiner

*Primary Examiner* — Rafael Pérez-Gutiérrez
*Assistant Examiner* — Suhail Khan
(74) *Attorney, Agent, or Firm* — Antonelli, Terry, Stout & Kraus, LLP.

(57) ABSTRACT

A radio system has silence periods in which wave transmission from a terminal is stopped and in which a base station measures external noise power. The base station includes a receiver for receiving a signal from the terminal, and a controller that has preset frequency information representing a frequency of diagnosing the receiver to a measurement frequency of external noise power, and diagnoses normality of the receiver by using one silence period out of plural silence periods on the basis of the frequency information while measuring the external noise power by using the other silence periods. When the receiver is diagnosed, the external noise cannot be measured during this silence period, and thus during this silence period the external noise measured during the just preceding silence period is held and applied as external noise under the diagnosis of the receiver.

20 Claims, 8 Drawing Sheets

| SECTION | ① ② | ②~③ | ③~④ |
|---|---|---|---|
| FUNCTIONAL BLOCK |  |  |  |
| GAIN [dB] | -1.0 | 15.0 | 36.0 |
| NOISE INDEX [dB] | 1.0 | 2.0 | 14.8 |
| TOTAL GAIN [dB] | -1.0 | 14.0 | 50.0 |
| TOTAL NOISE INDEX [dB] | 1.0 | 3.0 | 5.0 |

FIG. 5

| SECTION | ①~② | ②~③ | ③~④ |
|---|---|---|---|
| FUNCTIONAL BLOCK |  |  |  |
| GAIN [dB] | -1.0 | -1.0 | 36.0 |
| NOISE INDEX [dB] | 1.0 | 1.0 | 14.8 |
| TOTAL GAIN [dB] | -1.0 | -2.0 | 34.0 |
| TOTAL NOISE INDEX [dB] | 1.0 | 2.0 | 16.8 |

BASE STATION AND RECEIVER FAILURE DIAGNOSING METHOD

CLAIM OF PRIORITY

The present application claims priority from Japanese patent application JP 2008-223444 filed on Sep. 1, 2008, the content of which is hereby incorporated by reference into this application.

BACKGROUND OF THE INVENTION

1. Field of the Invention

The present invention relates to a base station and a receiver failure diagnosing method, and particularly to a base station and a receiver failure diagnosing method in a radio communication system.

2. Description of the Related Art

System stability is one of important elements to put a mobile communication system into practice. In order to operate the system stably, it is required not only to prevent occurrence of any failure causing stop of the system operation, but also to quickly detect and restore an occurring failure. Accordingly, a failure detecting circuit and a diagnosing system thereof in a radio base station are very important.

A transmitter and a receiver are mounted in a radio base station. Failure detection of the transmitter can be relatively easily implemented by branching a part of a transmission main signal generated by the transmitter and monitoring the part concerned. On the other hand, it is impossible to implement failure detection of the receiver by merely branching and monitoring a part of a reception signal. This is because the power of the reception signal input to the receiver varies every second in accordance with an installation environment and the connection number of terminals, etc. and thus it is impossible to set a threshold value for determining whether the reception power value is normal or abnormal. Accordingly, in order to implement the failure detection of the receiver, it is general to input some well-known test signal to the receiver and monitor the reception state of the receiver.

For example, JP-A-2002-246978 discloses a method of diagnosing a receiver by using a test signal whose power value is well known. According to this method, a test signal generator for outputting a test signal or a mechanism for distributing a transmission signal and then inputting the distributed transmission signal to a receiver is installed in the same radio base station. Furthermore, JP-A-2006-319616 discloses a simple receiver diagnosing method which does not use any well-known test signal, but use a receiver thermal noise.

The method disclosed in JP-A-2006-319616 uses, not a test signal, but thermal noise existing in the receiver for failure detection of the receiver. The thermal noise occurs because free electrons in a conductor make movements due to thermal energy, and it is uniformly distributed at all the frequencies. Accordingly, thermal noise necessarily occurs in a conductor existing at the input terminal of a receiver irrespective of the type of the receiver. Occurring thermal noise is amplified by an amplifier in the receiver as in the case of other reception signals, and then input to a demodulator. The failure detection circuit has, in the receiver, three high-frequency switches and an automatic gain control amplifier for making signal power input to the demodulator constant. By switching the three high-frequency switches, the signal passage in the receiver is switched, and normality of the receiver is diagnosed by using a gain value of the automatic gain control amplifier in each case.

SUMMARY OF THE INVENTION

In the mobile communication system, a broad service area is divided into many small areas called cells, and a radio base station device is disposed in each cell. The radio base station device is connected to a network, and a user terminal can perform wireless communication with the radio base station device of a cell to which the terminal concerned belongs and also perform communications with other terminals through a network. When some failure occurs in these radio communication base station, it is necessary to surely detect the failure concerned. Furthermore, it is required to continue 24-hour services during operation of the radio base station device, and thus it is important to detect the failure without any effect on the services. In addition, when failure detecting devices and circuits are designed in a large scale, the mount area and the power consumption increase and also the manufacturing cost price rises up. Therefore, it is desired that the radio base station device is implemented by a simple circuit construction.

The method disclosed in JP-A-2006-319616 can simply diagnose the receiver, however, it is difficult to receive a signal from an antenna and demodulate the signal during the period when the signal to be input to a demodulator is switched from a reception signal to thermal noise for diagnosis. As a countermeasure to this problem in the method disclosed in JP-A-2006-319616, a diversity reception construction is architected, and a radio communication base station performs a single branch operation during the period when one of diversity systems makes a diagnosis, whereby the service can be continued. However, when the single branch operation is performed during the diagnosis of the receiver, the service is not interrupted, however, the reception quality cannot be maintained in some cases. For example, in the case of Code Division Multiple Access (CDMA) system, the reception sensitivity is lowered by about 3 dB in some cases. When the deterioration of the reception sensitivity is severer, the transmission power of the radio terminal increases in the 1xEvolution-Data Only (1xEV-DO) system or the Ultra Mobile Broadband (UMB) system which perform the Power Back Off (PBO) control, and thus there is a risk that the continuous talk time is reduced or call breaking or reduction of traffic occurs due to blow-up of power. Accordingly, it is required that the service is not interrupted during diagnosis of a receiver and also the reception quality is maintained.

Therefore, the invention has an object to provide a base station and a receiver failure diagnosing method that can perform failure detection of a receiver in a radio communication base station without interrupting any service and without deteriorating the performance of the receiver by using a simple method. Furthermore, the invention has another object to make a diagnosis of a receiver in a radio communication base station by a minimum circuit construction.

In a UMB system which is being standardized as a CDMA 2000 1xEVDO system or a next-generation wireless data communication system, a radio communication base station receives signals transmitted from plural terminals for demodulation, transmits time information to terminals, and establishes synchronization with the terminals on the basis of this information. Furthermore, the terminals transmit signals to the radio communication base station, and there is a time zone for which the terminals simultaneously stop transmission of waves (signals) for about three frames (about 80 ms)

at a predetermined interval of 50 seconds to 7 minutes which is called "silence period". During this silence period, the radio communication base station receives external noise other than the signals from the terminals to measure the power of the external noise, and uses the measured external noise power to calculate the dynamic range of the signals received from the terminals. With respect to the time for which each terminal continues to transmit waves (signals) (the time other than the silence period) and the time of the silence period, times preset in the base station are transmitted to the terminals in advance. The terminals are synchronized with the time information transmitted from the base station, and automatically stop the wave transmission with no instruction from the base station when the present time is equal to a specific time. Furthermore, the base station likewise measures external noise with no report concerning stop of wave transmission from the terminals when the specific time for the stop of the wave transmission of the terminals has come.

According to the invention, the silence period for measuring the external noise is used for the diagnosis of receivers. Since the base station receives no signal from the terminals during the silence period, the base station can diagnose receivers without interrupting any existing service and without deteriorating the reception sensitivity by using this silence period. The failure of the receiver in the radio communication base station does not occur at a high frequency. Accordingly, it is not practical to monitor the receiver failure at all times, and it may be diagnosed periodically. The frequency at which a failure occurs in the receiver of the radio communication base station is remarkably lower than the frequency at which external noise varies. Accordingly, external noise is normally measured during the silence period, and a receiver diagnosis is made once per plural silence periods. When a receiver is diagnosed, the external noise cannot be measured during this silence period, and thus during this silence period the external noise measured during the just preceding silence period is held and applied as external noise under the diagnosis of the receiver.

Through the above method, the receiver diagnosis of the radio communication base station can be performed without interrupting any service and keeping reception quality by using the minimum circuit construction.

According to a diagnosis method of this invention, in a wireless communication system including a radio communication base station having an antenna, a receiver for receiving signals (waves) from terminals through the antenna and a diagnosis function unit for diagnosing normality of the receiver, and radio terminals for communicating with the radio communication base station, all the radio terminals stop transmission of signals (waves) in synchronism with a specific timing, and a switch provided in a main signal passage of the receiver is switched from the antenna to a terminator during this stop period (silence period) to prevent external noise from being input to the receiver and diagnose normality of the receiver. Furthermore, the diagnosis is made at a specific period to diagnose the normality of the receiver of the base station.

Furthermore, a base station having an antenna, a receiver for receiving a signal from a radio terminal through the antenna and a controller for determining normality of the receiver comprises: a first switch unit for transmitting time information to the radio terminal to be synchronized with the radio terminal, and performing a switching operation between the connection of an input terminal of the receiver to the antenna and the connection of the input terminal of the receiver to a specific test signal input in synchronism with a specific timing; a low-noise amplifier for amplifying a signal input from the input terminal of the receiver with low distortion; a second switching unit for switching a signal passage of the receiver to a first passage passing through the low-noise amplifier or to a second passage which does not pass through the low-noise amplifier; an amplifier for signals from the first passage and the second passage at a predetermined gain; and an automatic gain control amplifier for controlling the gain so that the output thereof is fixed, and amplifying the output from the amplifier at the controlled gain, wherein the controller connects the input terminal of the receiver to the specific test signal input by the first switching unit to input the test signal to the low-noise amplifier, switch the second switching unit to obtain a first gain of the automatic gain control amplifier in the case of the connection to the first passage and a second gain of the automatic gain control amplifier in the case of the connection to the second passage, and determine normality of the receiver when the obtained first and second gains are within a predetermined first range and a predetermined second range respectively, and the difference between the first and second gains is within a predetermined third range.

The terminal is a terminal for transmitting a signal to the base station, has a function of receiving time information from the base station, synchronizing transmission/reception with the base station on the basis of the time information and stopping transmission of the signal during a period for which the base station makes a receiver diagnosis.

According to the first solving means of this invention, there is provided a base station in a radio system having silence periods in which wave transmission from a terminal is stopped and the base station measures external noise power, the base station comprises:

a receiver for receiving a signal from the terminal; and a controller that has preset frequency information representing a frequency of diagnosing the receiver to a measurement frequency of external noise power, and diagnoses normality of the receiver by using one silence period out of plural silence periods on the basis of the frequency information while measuring the external noise power by using the other silence periods.

According to the second solving means of this invention, there is provided a receiver failure diagnosing method for diagnosing a failure of a receiver by a base station in a radio system having silence periods in which wave transmission from a terminal is stopped and the base station measures external noise power, the base station has preset frequency information representing a frequency of diagnosing the receiver to a measurement frequency of external noise power, and diagnoses normality of the receiver by using one silence period out of plural silence periods on the basis of the frequency information while measuring the external noise power by using the other silence periods.

According to the invention, it is possible to provide a base station and a receiver failure diagnosing method that can perform failure detection of a receiver in a radio communication base station without interrupting any service and without deteriorating the performance of the receiver by using a simple method. Furthermore, according to the invention, it is possible to make a diagnosis of a receiver in a radio communication base station by a minimum circuit construction.

DETAILED DESCRIPTION OF THE PREFERRED EMBODIMENT

A method of diagnosing a receiver of a radio communication base station without interrupting any service will be described in detail with reference to the drawings.

Figure 1:
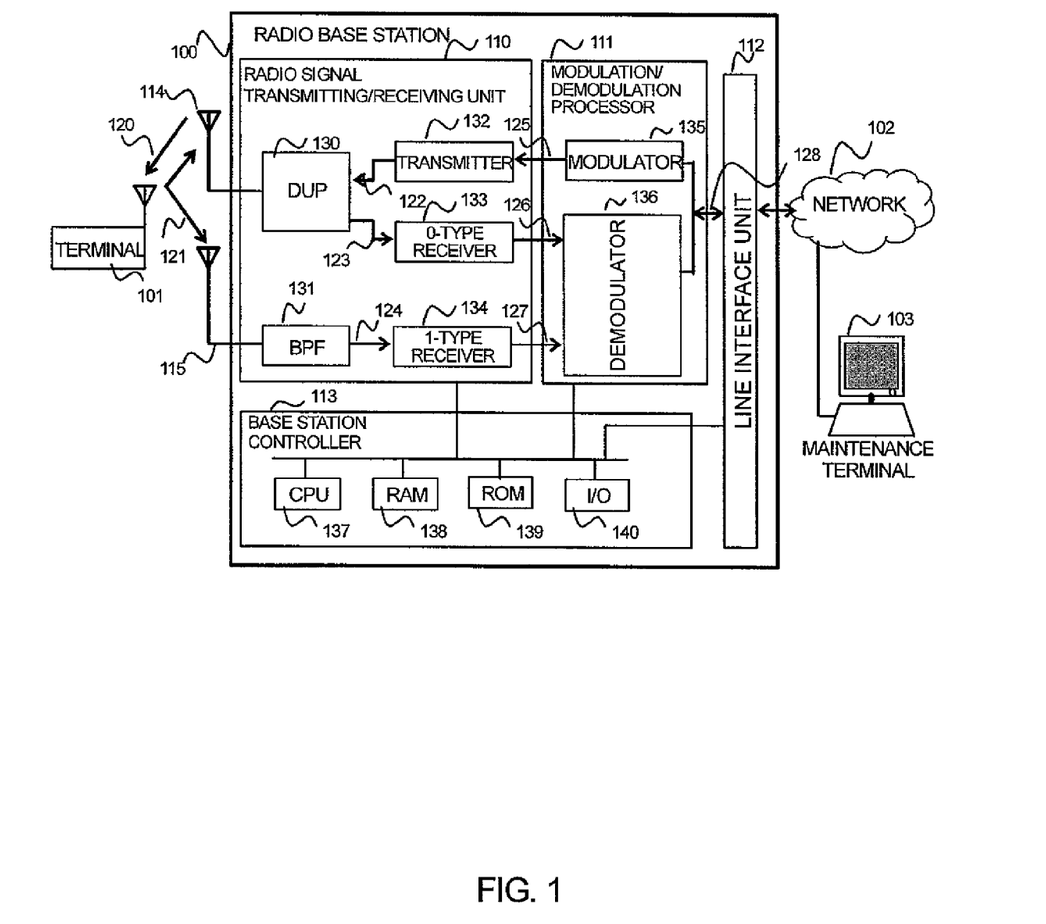
FIG. 1 is a block diagram showing a radio base station device according to an embodiment of the invention.

FIG. 1 is a diagram showing the construction of the radio base station.

An embodiment of the invention will be described by exemplifying a radio base station that has a transmitter of one system and receivers of two systems to enable diversity reception. The radio base station 100 comprises a radio signal transmitting/receiving unit 110, a modulation/demodulation processor 111, a line interface unit 112 and a base station controller 113. The radio signal transmitting/receiving unit 110 has a transmitter 132 of one system and receivers of two systems (0-type receiver 133 and 1-type receiver 134), and a 0-type antenna 114 shared to transmission and reception and a 1-type antenna 115 for reception are connected to the radio signal transmitting/receiving unit. Furthermore, the radio signal transmitting/receiving unit 110 has DUP (duplexer) 130 for separating a down-link radio signal 120 and an up-link radio signal 121 from each other, and a BPF (band pass filter) 131 for limiting the pass band of the up-link radio signal 121.

The transmitter 132 converts a down-link baseband signal 125 input from the modulator 135 to a down-link radio signal 122. The 0-type receiver 133 converts an up-link radio signal 121 transmitted from a terminal 101 to an up-link baseband signal 126, and the 1-type receiver 134 converts an up-link radio signal 121 transmitted from the terminal 101 to an up-link baseband signal 127. The modulation/demodulation processor 111 has a modulator 135 and a demodulator 136, and performs data modulation and demodulation. The line interface unit 112 is an interface for the connection between the radio base station 100 and a network 102. The base station controller 113 has a monitoring/controlling function for the radio base station 100. For example, the base station controller 113 has CPU 137, a memory (for example, RAM 138, ROM 139) and I/O 140. The base station controller 113 is connected to the radio signal transmitting/receiving unit 110, for example, and can transmit/receive information to/from the receiver in the radio signal transmitting/receiving unit 110. A maintenance terminal 103 is connected to the base station controller 113 through the network 102, and has a function of monitoring and controlling the radio base station 100 by remote control.

This radio system has a silence period for which the terminal stops transmission of waves every predetermined period. Frequency information representing a receiver diagnosing frequency corresponding to the measurement frequency of external noise power is preset in the base station controller 113. According to the frequency information, normality of the receiver is diagnosed by using one of plural silence periods, and the external noise power is measured by using the other silence periods.

Figure 2:
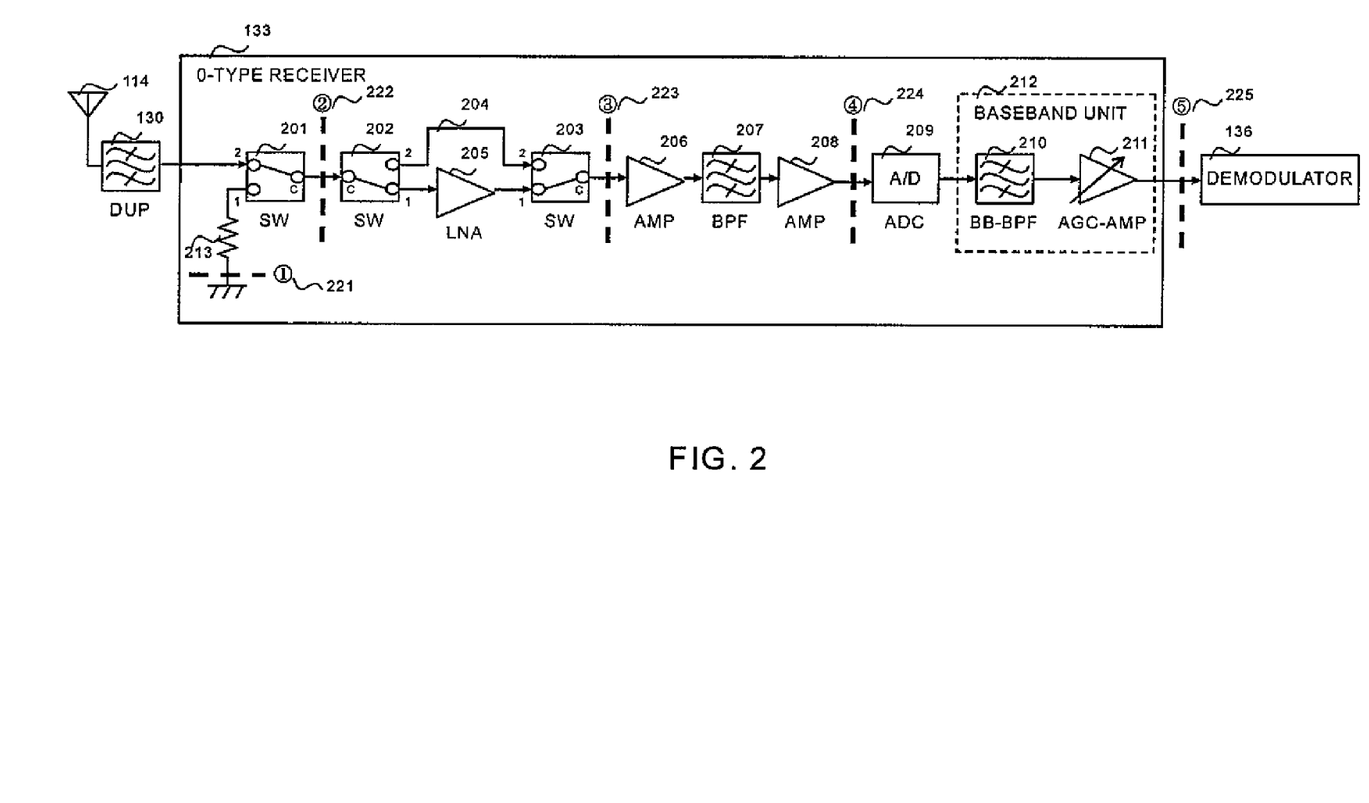
FIG. 2 is a block diagram showing a receiver failure detecting circuit according to the embodiment.

FIG. 2 is a diagram showing the construction of the receiver.

A failure detection circuit for implementing failure detection of the receiver will be described with reference to FIG. 2. FIG. 2 shows the construction of the 0-type receiver 133, however, the description of the 1-type receiver 134 is omitted because the 0-type receiver 133 and the 1-type receiver 134 can be designed to have the same construction.

The 0-type receiver 133 has plural switches SW 201 (first switch unit), SW 202 and SW 203 (SW 202 and SW 203 are represented as second switch units), LNA (Low Noise Amplifier) 205, AMP (Amplifier) 206, AMP 208, BPF (Band Pass Filter) 207, ADC (AD converter) 209, a baseband unit 212 and a terminator 213. The baseband unit 212 has BB-BPF (Baseband Band Pass Filter) and AGC-AMP (Automatic Gain Control Amplifier). LNA 205 (first amplifier), AMP 206, BPF 207 and AMP 208 (second amplifier) may be replaced by other suitable constituent elements.

The receiver failure detecting circuit according to this embodiment has three high-frequency switches of SW 201, SW 202, SW 203 in the receiver. For example, semiconductor switches may be used as these three switches, and they can perform a high-speed switching operation. SW 201 has a function of performing the switching operation as to whether the input terminal of the receiver is connected to the antenna 114 or the terminal 213. SW 202 and SW 203 operate at the same time, and has a function of performing the switching operation as to whether the signal passage of the receiver is passed through LNA (Low Noise Amplifier) 205 or it is set to a passage 204 bypassing LNA 205. When each of SW 202 and SW 203 is set to the terminal 1 side thereof (hereinafter referred to as "SW setting (1)"), the signal passage is set to a passage passing through LNA 205. When each of SW 202 and SW 203 are set to the terminal 2 side (hereinafter referred to as "SW setting (2)"), the signal passage is set to the passage 204 bypassing LNA 205.

LNA 205 represents a low noise amplifier for amplifying a reception signal with low distortion. AMP 206 and AMP 208 are amplifiers for amplifying the reception signals. BPF 207 is a band pass filter for attenuating unnecessary signal components in bands other than the self band. ADC 209 is a AD converter for converting the input signal thereto from an analog signal to a digital signal. BB-BPF 210 is a band pass filtering function implemented through digital signal processing. AGC-AMP 211 is a automatic gain control amplifier, and has a function of changing the gain of the amplifier in accordance with the input power so that the signal power input to the demodulator 136 is fixed. In FIG. 2, the function of AGC-AMP 211 is implemented as the function of the baseband unit 212, however, it may be implemented by analog signal processing.

For example, there is considered such a situation that the gain of AGC-AMP 211 is subjected to close-loop control so that the up-link signal power at the input port of the demodulator is equal to 0 dBm. Gain-variable parts out of the parts constituting the receiver are limited to only AGC-AMP 211, and the other parts have fixed gains. When the total gain value of all the other parts excluding AGC-AMP 211 is defined as a receiver fixed gain, the following equation is satisfied.

(reception power)+(receiver fixed gain)+(gain of AGC-AMP)=0 dBm

Accordingly, the gain of AGC-AMP 211 is subjected to close-loop control so that the following equation is satisfied.

(gain of AGC-AMP)=−(receiver fixed gain)−(reception power)

Since the receiver fixed gain is fixed, an expected value exists for the gain value of AGC-AMP 211 when a signal whose power value is known is input to the input terminal of the receiver. That is, the normality of the receiver can be diagnosed by checking whether the gain value of AGC-AMP 211 is in the range of the expected value. The normality diagnosis of the receiver will be described in more detail later.

Figure 3:
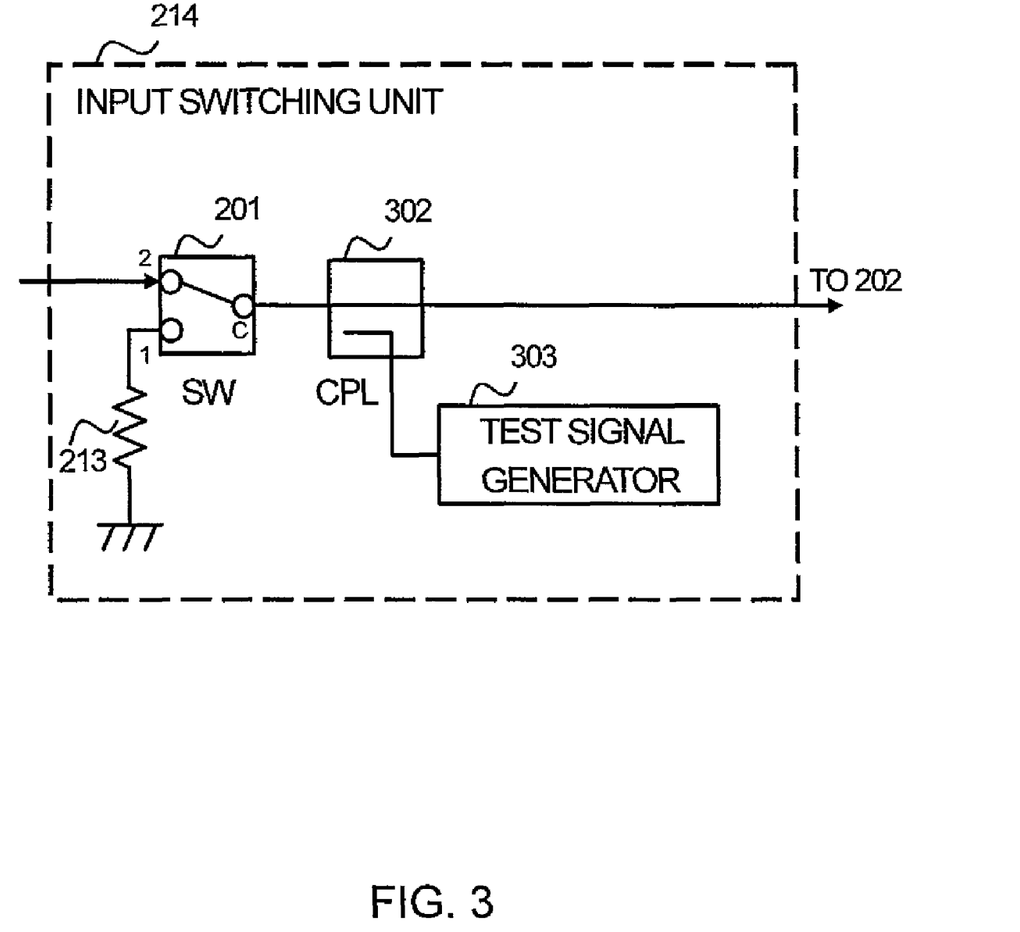
FIG. 3 is a block diagram showing an input switching unit according to the embodiment.

FIG. 3 is a diagram showing the construction of the input switching unit. Any signal may be used as the input signal used for diagnosis insofar as it can input a signal having fixed power to the reception band used in the receiver 133. Accordingly, a coupler 302 and a test signal generator 303 may be further provided between the switch 201 and SW 202 in FIG. 2. In the construction of FIG. 2, the terminator 213 is connected through SW 201 to use thermal noise as the input signal. On the other hand, in the construction of FIG. 3, a test signal is generated in the test signal generator 303 of the input switching unit 214, and is synthesized with an input signal in the coupler 302 and output to SW 202. In this case, in synchronism with the operation of SW 201, the test signal generator 303 outputs the test signal during the period when SW 201 is connected to the terminator 213.

Figure 4:
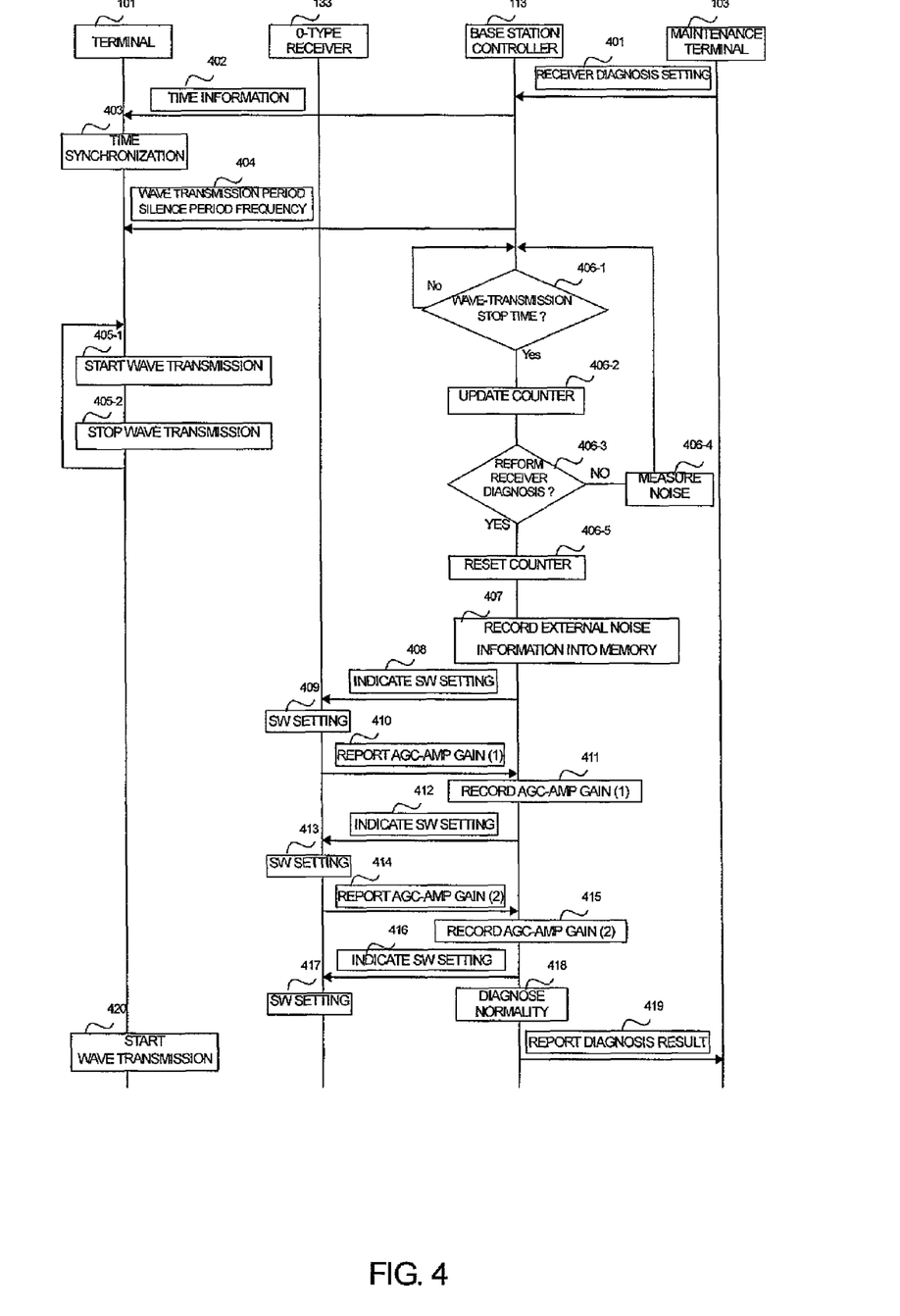
FIG. 4 is a sequence diagram showing receiver failure detection in the embodiment.

FIG. 4 is a sequence diagram showing receiver failure detection (receiver normality diagnosis).

A method of detecting a receiver failure according to this embodiment will be described. The 0-type receiver 133 and the 1-type receiver 134 can be diagnosed in the same procedure. Therefore, in the following description, the diagnosis procedure for the 0-type receiver 133 will be described, and the diagnosis procedure for the 1-type receiver 134 is omitted.

The receiver normality diagnosis can be automatically performed through no maintenance worker. For example, when the wave transmission period of the terminal 101 (corresponding to the interval of the two silence periods) is set to 5 minutes, the silence period is set to 80 ms and the receiver diagnosing frequency is set to one diagnosis over ten silence periods, the radio base station 100 makes a diagnosis of the 0-type receiver 133 once every about 50 minutes. Or, the maintenance worker may start the diagnosis by operating the maintenance terminal 103 to input an instruction of executing the receiver normality diagnosis. At this time, the instruction of executing the receiver normality diagnosis contains an indication of a base station to be tested and an indication of a receiver to be diagnosed (for example, sector and type), for example. The wave transmission period of the terminal, the silence period and the receiver diagnosing frequency are not limited to the above values, and may be set to suitable time and frequency.

In step 401, the maintenance terminal 103 sets the receiver diagnosis to the base station controller 113. For example, through the operation of the maintenance worker, the maintenance terminal 103 inputs the time for which the terminal 101 continues to transmit waves (the wave transmission time, the silence period interval, wave transmission period), the silence period and the receiver diagnosing frequency information. The maintenance terminal 103 sets each information of the input wave transmission period, the silence period and the receiver diagnosing frequency information in the base station controller 113 (receiver diagnosis setting).

In step 402, the base station controller 113 transmits time information to the terminal 101. In step 403, the terminal 101 establishes time-synchronization with the base station controller 113 on the basis of the time information received from the base station controller 113 in step 402. In step 404, the base station controller 113 transmits the time for which the terminal 101 continues to transmit waves (wave transmission period), the silence period and the frequency information to the terminal 101. Furthermore, the step 402 and the step 404 may be executed in an appropriate order.

In step 405-1, the terminal 101 starts radio wave transmission. The terminal 101 continues to transmit the waves of a radio signal during the wave transmission period obtained in step 404. In step 405-2, when the wave transmission time elapses, the terminal 101 stops the radio wave transmission. Thereafter, the terminal 101 stops the radio wave transmission during the silence period obtained in step 404. When the silence period elapses, the processing goes to step 405-1 or 420, and the radio wave transmission is started again. In the sequence diagram of FIG. 4, the sequence from the step 405-1 to the step 405-2 is repeated at a preset frequency in the base station controller 113. For example, in this example, the receiver is diagnosed at a rate of one period to ten silence periods. Therefore, the sequence is repeated at ten times, and after the repetition of the ten-times, the processing goes to the step 420. Subsequently to the step 420, the same processing as the steps 405-1, 405-2 is executed. For convenience, the steps 405 and 420 are illustrated as being separated from each other in FIG. 4, however, the processing of the terminal repeats the wave transmission and the stop of the wave transmission.

On the other hand, in the base station controller 113, it is determined on the basis of the wave transmission period and the silence period in step 406-1 whether the present time is the wave-transmission stop time (the present time is the silence period) When the wave-transmission stop time is determined, the base station controller 113 renews the counter in step 406-2. For example, the base station controller 113 adds "1" to the counter every wave-transmission stop time. The counter may be provided in the base station controller 113, or a count value may be stored in RAM 138 or the like. The timing at which the wave-transmission stop time is determined in the base station controller 113 is coincident with the timing of the wave-transmission stop in the terminal 101 because the time-synchronization is established between the terminal 101 and the base station controller 113. The wave-transmission start timing may be matched by setting a wave-transmission start time of the terminal 101 or the like.

In step 406-3, the base station controller 113 determines whether the receiver diagnosing timing has come. For example, in the present example, the receiver diagnosis is made for one period over ten silence periods. Specifically, when the value of the counter is coincident with the frequency information (for example, ten times) obtained in step 404, it may be determined that the receiver should be diagnosed. A suitable method other than described above may be used as the method of determining the receiver diagnosing timing. When the receiver diagnosing timing has not yet come, the base station controller 113 measures power of external noise other than the signal during the silence period (step 406-4), and then the processing returns to step 406-1.

On the other hand, when the receiver diagnosing timing has come, the value of the counter is reset (step 406-5), the processing goes to step 407. In step 407, before starting the receiver diagnosis, the base station controller 113 records an external noise measurement result obtained during the previous silence period into RAM 138 in the base station controller 113. Since no external noise is measured during the silence period concerned at the receiver diagnosis timing, the external noise measurement result recorded in RAM 138 can be used until external noise is next measured.

In steps 408 to 418, the base station controller 113 diagnoses the normality of the receiver and reports the diagnosis result to the maintenance terminal 103 in step 419. The normality diagnosis of the receiver may be performed by using the method disclosed in JP-A-2006-319616, for example, however, other appropriate methods may be used. The base station controller 113 may perform the normality diagnosis for the two receivers 133 and the receiver 134 in parallel. Furthermore, the normality diagnosis may be performed for the respective receivers during different silence periods.

The normality diagnosis of the receiver will be described hereunder.

In step 408, the base station controller 113 instructs the 0-type receiver 133 to set SW 201 to SW 203. In step 409, the 0-type receiver 133 sets SW 201 to the terminal 1 side and sets SW 202 and SW 203 to the terminal 1 side (SW setting (1)). Accordingly, the receiver input terminal is terminated, so that the 0-type receiver 133 is equivalently set to a state under which only thermal noise is input to the 0-type receiver 133. When the construction shown in FIG. 3 is used, the test signal is generated from the test signal generator 303, and the 0-type receiver 133 is equivalently set to a state under which the test signal is input to the 0-type receiver 133. When the receiver is connected to the antenna 114, the up-link radio signal and the external noise are input to the receiver. The power of these signals varies every second in accordance with the installation environment of the base station 100, the connection number of terminals, etc., so that the reception power value cannot be regarded as being fixed. Therefore, the receiver input terminal is terminated during a diagnosis to perform the diagnosis with high precision eliminating these effects.

In step 410, the 0-type receiver 133 reports the gain value of AGC-AMP to the base station controller 113 (the reported value will be hereinafter represented as AGC-AMP gain (1)). In step 411, the base station controller 113 records the AGC-AMP gain (1) reported from the 0-type receiver 133 into RAM 138.

In step 412, the base station controller 113 instructs the 0-type receiver 133 to set SW 201 to SW 203. In step 413, the 0-type receiver 133 sets SW 201 to the terminal 1 side, and sets SW 202 and SW 203 to the terminal 2 side (SW setting (2)). In step 414, the 0-type receiver 133 reports the gain value of AGC-AMP to the base station controller 113 (the reported value will be hereinafter represented as AGC-AMP gain (2)). In step 415, the base station controller 113 records the AGC-AMP gain (2) reported from the 0-type receiver 133 into RAM 138.

In step 416, the base station controller 113 instructs the 0-type receiver 133 to set SW 201 to SW 203. In step 417, the 0-type receiver 133 sets SW 201 to the terminal 2 side, and sets the SW 202 and SW 203 to the terminal 1 side. Accordingly, the 0-type receiver 133 can receive the up-link radio signal 121 because the receiver input terminal is connected to the antenna 114, and thus it is restored to a normal operation state.

In step 418, the base station controller 113 diagnoses the normality of the receiver by using the AGC-AMP gain (1) and the AGC-AMP gain (2) stored in RAM 138. In step 419, the base station controller 113 reports the diagnosis result to the maintenance terminal 103. The diagnosis result may contain information for identifying the diagnosed receiver (for example, sector and type) and the gain value of AGC-AMP 211 stored in RAM 138 and/or information indicating whether a receiver failure occurs or not. The maintenance terminal 103 receives the diagnosis result, displays the received diagnosis result on a display unit and/or stores it into a recording unit, and then finishes this diagnosis. In step 420, the terminal 101 re-starts the wave transmission after the silence period elapses.

Figure 5:
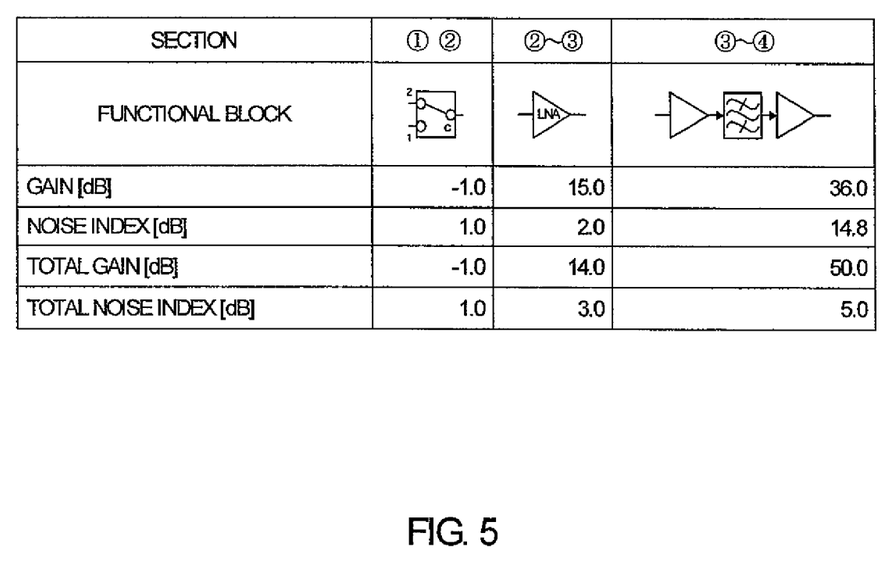
FIG. 5 is a diagram showing the performance of a receiver in the case of SW setting (1) in the embodiment.
Figure 6:
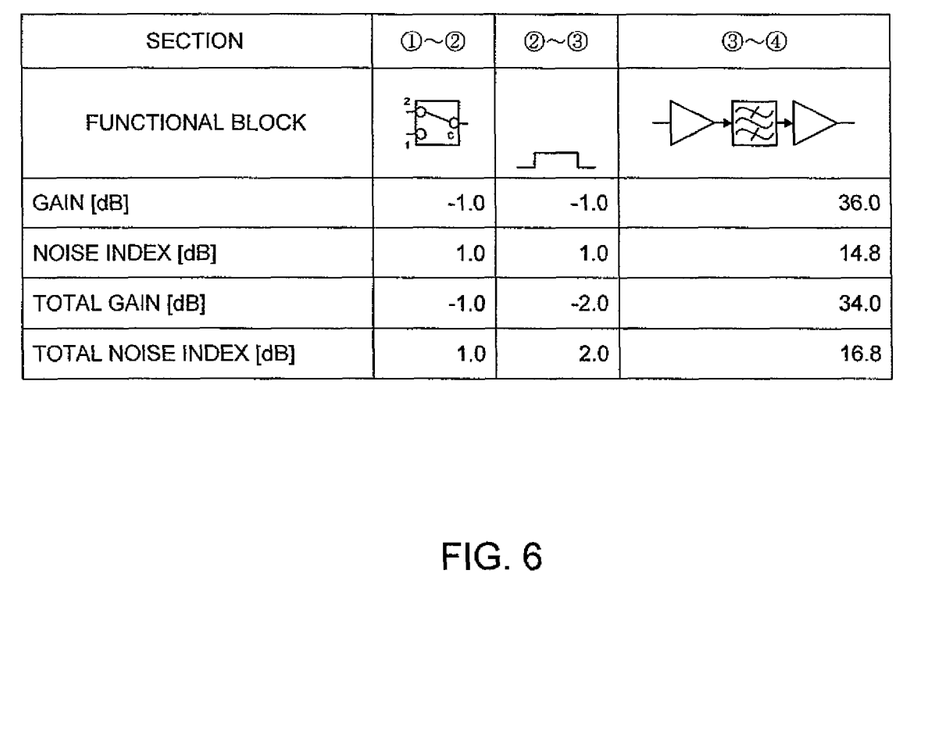
FIG. 6 is a diagram showing the performance of the receiver in the case of SW setting (2) in the embodiment.

FIGS. 5 and 6 are diagrams showing the performance of the receiver in the case of the SW settings (1) and (2). In this case, the diagnosis of the normality of the receiver when this embodiment is applied to a narrow-band Code Division Multiple Access (CDMA) type radio base station will be described as an example.

In the following description, thermal noise is used as an input as shown in FIG. 2, however, the test signal may be likewise used. The gain and noise index of each section of the 0-type receiver 133, for example, are based on the performance shown in FIG. 5 in the case of the SW setting (1), and also on the performance shown in FIG. 6 in the case of the SW setting (2). FIGS. 5 and 6 represent the gain, noise index, total gain and total noise index of each section. The total gain corresponds to the whole gain of the section concerned, and it is calculated from the gain values of the respective parts. For example, in FIGS. 5 and 6, the numeral value indicated in the column of the total gain for the sections (2) to (3) represents the gain from the sections (1) to (3), and the numerical value indicated in the column of the total gain for the sections (3) to (4) represents the gain from the sections (1) to (4). Furthermore, the total noise index corresponds to the whole noise index of the section concerned, and it is calculated from the gain values and noise index values of the individual parts. For example, in FIGS. 5 and 6, the numerical value indicated in the column of the total noise index for the sections (2) to (3) represents the noise index from the sections (1) to (3), and the numerical value indicated in the column of the total noise index for the sections (3) to (4) represents the noise index from the sections (1) to (4). The noise index represents how degree the S/N ratio is deteriorated in accordance to an input having a small level such as thermal noise, and the deterioration degree of the S/N ratio is small when the input level is large.

For example, in the sections (2) to (3) of FIG. 5, thermal noise is input to LNA 205, and thus the total noise index increases by only the amount corresponding to the noise index of LNA. However, in the sections (3) to (4), an amplified signal is input to AMP 206, and thus the increase (2.0 dB) of the total noise index is smaller than the noise index (14.8 dB) of the sections (3) to (4). On the other hand, in FIG. 6, a thermal noise level signal is input to AMP 206 in the sections (3) to (4) because it does not pass through LNA 205, and thus the total noise index increases by only the amount corresponding to the noise index (14.8 dB) of the sections (3) to (4), for example. The gain of AGC-AMP 211 is assumed to be subjected to the close loop control so that the power at a port (5) 225 is equal to 0 dB. The thermal noise power occurring at a port (1) 221 can be calculated by the following equation.

$$\text{(thermal noise power of port (1)} = 10 \cdot \log(k \cdot T \cdot BW \cdot 103)$$
$$[\text{dBm}]$$

Here, k: Boltzmann constant=$1.38 \times 10^{-23}$ [J/K], T: absolute temperature [K], BW: reception band width [Hz].

The reception band width of the narrow-band CDMA type radio base station is equal to 1.23 MHz, and thus the thermal noise power at the port (1) is equal to −113 dBm at a temperature of 25° C. SW 201 is set to the terminal 1 side, and the receiver input terminal is terminated, so that this thermal noise is input to the receiver.

Figure 7:
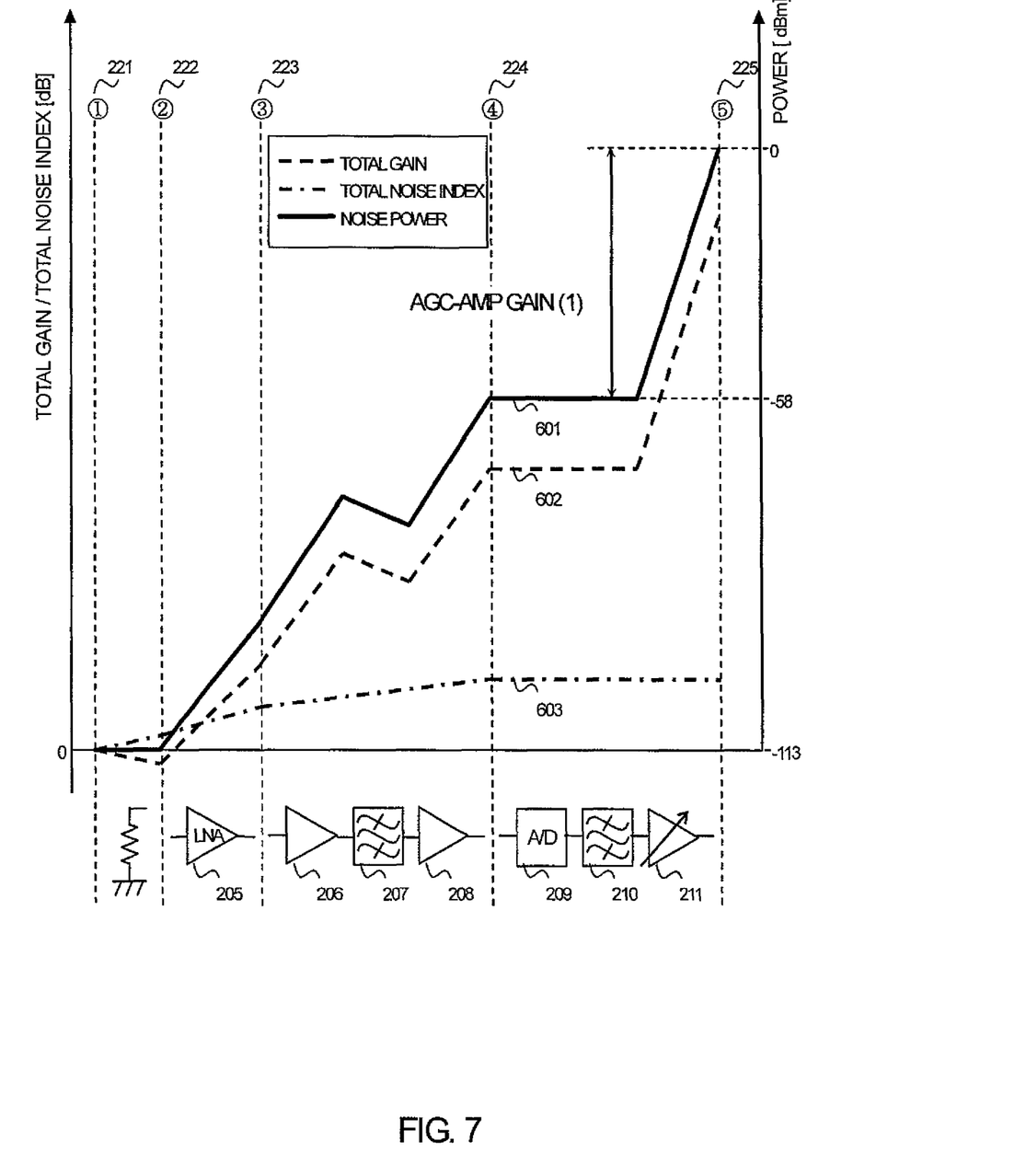
FIG. 7 is a level diagram of the receiver in the case of the SW setting (1) in the embodiment.
Figure 8:
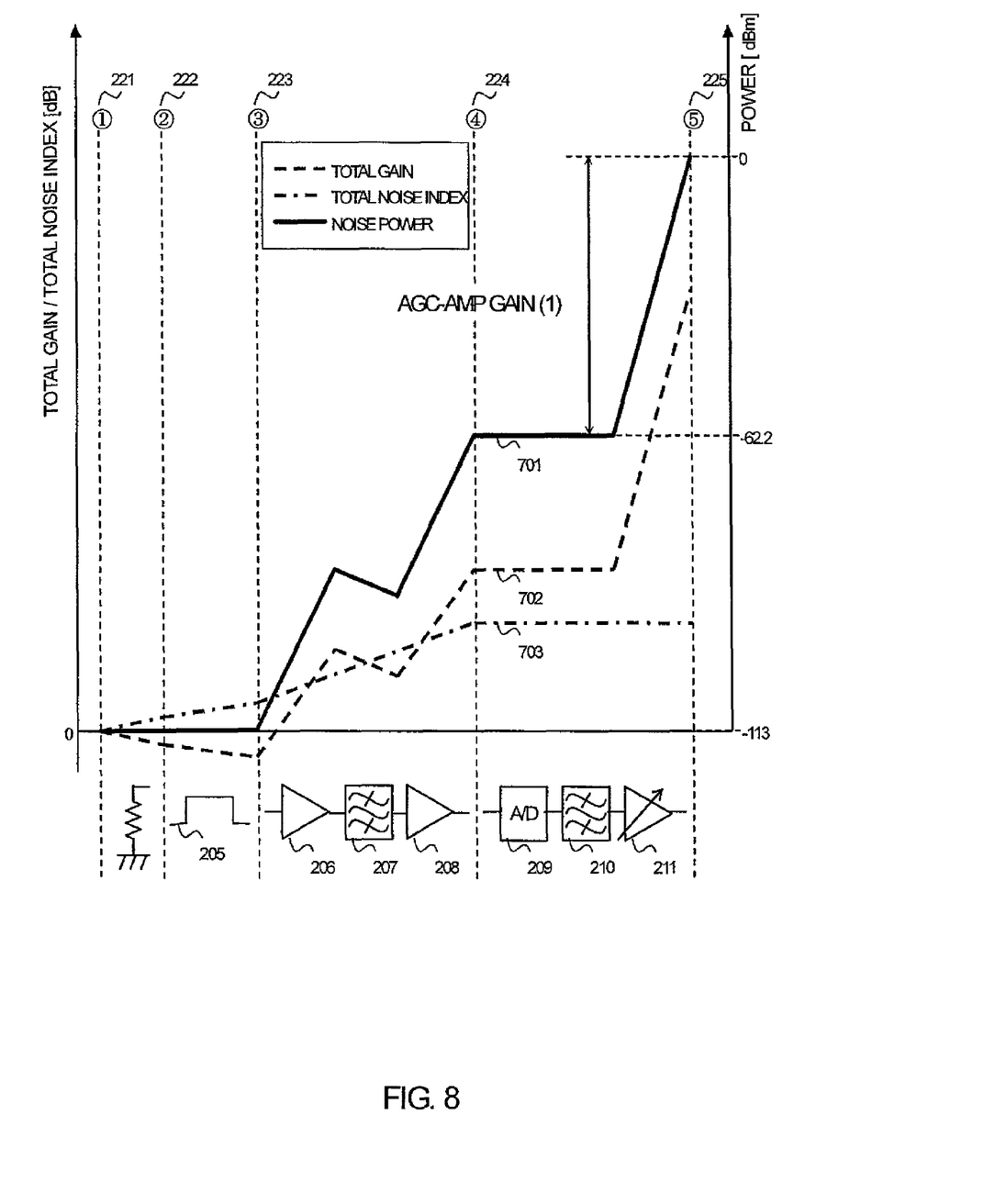
FIG. 8 is a level diagram of the receiver in the case of the SW setting (2) in the embodiment.

FIGS. 7 and 8 are level diagrams of the receiver in the case of the SW setting (1) and the SW setting (2). The total gain of the receiver, the total noise index and the noise power of the receiver, for example, vary at the levels shown in FIGS. 7 and 8. The thermal noise power occurring at the port (1) 221 is equal to −113 dBm (1.23 MHz in band width and 25° C. in temperature), for example. SW 201 is set to the terminal 1 side, and the receiver input terminal is terminated, so that no signal other than this thermal noise is input to the receiver.

In the case of the SW setting (1), the thermal noise occurring at the port (1) 221 reaches the port (4) as indicated in the level diagram of the noise power 601. The reception power at the port (4) 224 can be calculated by the following equation.

(reception power at port (4)=(thermal noise power of port (1))+(total gain from port (1) to port (4))+ (total noise index from port (1) to port (4))=−113 dBm+50 dB+5 dB=−58 dBm Accordingly, the gain of AGC-AMP 211 is subjected to the close loop control so that it is equal to +58 dB. Accordingly, the expected value of the AGC-AMP gain (1) can be calculated as 58 dB.

However, dispersions caused by the following factors exist in the value of the AGC-AMP gain (1). One dispersion is caused by the factor that thermal noise power occurring at the port (1) 221 varies by ±1 dB with respect to the temperature (between −40° C. and +85° C.). The other dispersion is caused by the factor based on the individual dispersions of the constituent parts between the port (1) 221 and the port (4) 224. This dispersion varies in accordance with the circuit scale, the parts being used, etc. of the receiver, and it generally ranges from about ±1 dB to about ±3 dB. Dispersions other than the dispersions described above may be considered. A threshold value for normality determination is required to be determined in consideration of these dispersions, and for example, the expected value is set to 58 dB, the permissible range is set to ±3 dB and the standard value of the AGC-AMP gain (1) is set within 58 dB±3 dB. The expected value of the AGC-AMP gain (1) and the dispersion value are examples, and other values may be adopted.

Next, the case of the SW setting (2) will be described. In the case of the SW setting (2), the thermal noise occurring at the port (1) 221 reaches the port (4) as indicated in the level diagram of the noise power 701 in FIG. 8. As in the case of the SW setting (1), the reception power at the port (4) 224 can be calculated by the following equation.

(reception power of port (4)=−113 dBm+34 dB+16.8 dB=−62.2 dBm

Accordingly, the gain of the AGC-AMP 211 is subjected to the close loop control so that it is equal to +62.2 dB. As in the case of the AGC-AMP gain (1), the expected value is set to 62.2 dB, the permissible range is set to ±3 dB and the standard value of the AGC-AMP gain (2) is set in the range of 62.2 dB±3 dB. The expected value of the AGC-AMP gain (2) and the value of the dispersion are examples and thus other values may be used.

Here, it is assumed that the AGC-AMP gain (1) recorded by the base station controller 113 in step 411 is equal to 60 dB. This value is within the standard range of the AGC-AMP gain (1). However, it does not necessarily certify that the receiver is normal. For example, there is considered such a situation that a signal is not amplified because LNA 205 is broken down and thus only thermal noise is input to the port (3) 223. In this case, the noise signal power conforms to the same level diaphragm as the noise power 701. That is, this is equivalent to the condition of the SW setting (2). Therefore, the gain of AGC-AMP 211 is potentially set to a value in the range of 62.2 dB±3 dB. That is, even when LNA 205 is broken down, the AGC-AMP gain (1) may take 60 dB.

In order to prevent such a false diagnosis as described above, in the above step 418, a receiver satisfying all the following conditions is determined as being normal, and other receivers are determined as being abnormal.

1. The AGC-AMP gain (1) is within 58 dB±3 dB (first range),
2. the AGC-AMP gain (2) is within 62.2 dB±3 dB (second range), and
3. (AGC-AMP gain (2))−(AGC-AMP gain (1)) is within 4.2 dB±1 dB (third range).

The standard value of (AGC-AMP gain (2))−(AGC-AMP gain (1)) will be described.

The expected value of (AGC-AMP gain (2))−(AGC-AMP gain (1)) is equal to the value obtained by subtracting the expected value of AGC-AMP gain (1) from the expected value of AGC-AMP gain (2), and thus it is equal to 4.2 dB. The dispersion of this value is smaller than the dispersions of the AGC-AMP gain (1) and the AGC-AMP gain (2). This reason for this is as follows. In the circuits for measuring the AGC-AMP gain (1) and the AGC-AMP gain (2), the constituent parts between the port (1) 221 and the port (2) 222 and between the port (3) 223 and the port (4) 224 are common. Since the constituent parts between the port (1) 221 and the port (2) 222 are common, the effect that the thermal noise power occurring at the port (1) 221 varies in accordance with the temperature is eliminated. Furthermore, since the constituent parts between the port (3) 223 and the port (4) 224 are common, the individual dispersions of the parts constituting this section is irrelevant. Accordingly, the dispersion of the value of (AGC-AMP gain (2))−(AGC-AMP gain (1)) is dependent only on the dispersion between the port (2) 222 and the port (3) 223, that is, the dispersion in performance of LNA 205. For example, in accordance with the performance concerning the gain and the noise, the permissible range may be set to ±1 dB, and the standard value of (AGC-AMP gain (2))−(AGC-AMP gain (1)) may be set within 4.2 dB±1 dB. Other values may be adopted. The failure of LNA 205 can be detected by setting the value of (AGC-AMP gain (2))−(AGC-AMP gain (1)) as the determination condition for the normality diagnosis. Furthermore, even when failures occur in parts other than LNA 205, they can be detected. This is because when a failure occurs in AMP 206, for example, the values of the AGC-AMP gain (1) and the AGC-AMP gain (2) are substantially equal to each other and thus the determination condition 3 is not satisfied. The same is applied to the other parts. Accordingly, by using the three determination conditions described above, the normality diagnosis of the receiver can be implemented.

The invention is applicable to a radio communication system.

What is claimed is:

1. A base station in a radio system having silence periods in which wave transmission from a terminal is stopped and the base station measures external noise power, the base station comprises:
   a receiver for receiving a signal from the terminal; and
   a controller that has preset frequency information representing a frequency of diagnosing the receiver to a measurement frequency of external noise power, and diagnoses normality of the receiver during only one silence period out of plural silence periods on the basis of the frequency information while measuring the external noise power during only other silence periods out of the plural silence periods.

2. The base station according to claim 1, wherein the controller
   receives, from a maintenance terminal, wave transmission period information representing the length of a time for which the terminal transmits waves and silence period information representing the length of the silence period, and determines on the basis of the wave transmission period information and the silence period information whether the present time is a silence period or not.

3. The base station according to claim 2, wherein the controller establishes time-synchronization with the terminal so that a timing at which the terminal stops the wave transmission according to the wave transmission period information and the silence period information from the maintenance terminal is coincident with a timing at which the controller determines that the present time is the silence period.

4. The base station according to claim 1, wherein the controller has a counter for counting a number of times of the silence periods,
wherein the controller
adds the value of the counter every silence period, and
determines on the basis of the frequency information and the value of the counter whether the silence period of the present time corresponds to a timing at which normality of the receiver is to be diagnosed or not.

5. The base station according to claim 1, wherein the controller has a storage unit for storing external noise power measured during the silence period just before the silence period for which normality of the receiver is diagnosed,
wherein the controller uses the external noise power stored in the storage unit to calculate a dynamic range of a signal received from the terminal until the silence period for which the external noise power is next measured.

6. A receiver failure diagnosing method for diagnosing a failure of a receiver by a base station in a radio system having silence periods in which wave transmission from a terminal is stopped and the base station measures external noise power, the base station
has preset frequency information representing a frequency of diagnosing the receiver to a measurement frequency of external noise power, and
diagnoses normality of the receiver during only one silence period out of plural silence periods on the basis of the frequency information while measuring the external noise power during only other silence periods out of the plural silence periods.

7. The receiver failure diagnosing method according to claim 6, wherein the base station
receives, from a maintenance terminal, wave transmission period information representing the length of a time for which the terminal transmits waves and silence period information representing the length of the silence period, and
determines on the basis of the wave transmission period information and the silence period information whether the present time is a silence period or not.

8. The receiver failure diagnosing method according to claim 7, wherein
the base station establishes time-synchronization with the terminal so that a timing at which the terminal stops the wave transmission according to the wave transmission period information and the silence period information from the maintenance terminal is coincident with a timing at which the controller determines that the present time is the silence period.

9. The receiver failure diagnosing method according to claim 6, wherein the base station
adds a value of a counter every silence period, and
determines on the basis of the frequency information and the value of the counter whether the silence period of the present time corresponds to a timing at which normality of the receiver is to be diagnosed or not.

10. The receiver failure diagnosing method according to claim 6, wherein
the base station uses the external noise power stored in a storage unit, which stores external noise power measured during the silence period just before the silence period for which normality of the receiver is diagnosed, to calculate a dynamic range of a signal received from the terminal until the silence period for which the external noise power is next measured.

11. A base station in a radio system having silence periods in which wave transmission from a terminal is stopped and the base station measures external noise power, the base station comprises:
a receiver for receiving a signal from the terminal; and
a controller that has preset frequency information representing a frequency of diagnosing the receiver to a measurement frequency of external noise power, and diagnoses normality of the receiver by measuring external noise power only in one silence period out of plural silence periods, storing the measured external noise power and diagnosing normality of the receiver only during a later one of the plural silence periods on the basis of the frequency information and the stored external noise power.

12. The base station according to claim 11, wherein the controller
receives, from a maintenance terminal, wave transmission period information representing the length of a time for which the terminal transmits waves and silence period information representing the length of the silence period, and
determines on the basis of the wave transmission period information and the silence period information whether the present time is a silence period or not.

13. The base station according to claim 12, wherein the controller establishes time-synchronization with the terminal so that a timing at which the terminal stops the wave transmission according to the wave transmission period information and the silence period information from the maintenance terminal is coincident with a timing at which the controller determines that the present time is the silence period.

14. The base station according to claim 11, wherein the controller has a counter for counting a number of times of the silence periods,
wherein the controller
adds the value of the counter every silence period, and
determines on the basis of the frequency information and the value of the counter whether the silence period of the present time corresponds to a timing at which normality of the receiver is to be diagnosed or not.

15. The base station according to claim 11, wherein the controller has a storage unit for storing the external noise power measured during the only one silence period just before the later one silence period for which normality of the receiver is diagnosed,
wherein the controller uses the external noise power stored in the storage unit to calculate a dynamic range of a signal received from the terminal until the silence period for which the external noise power is next measured.

16. A receiver failure diagnosing method for diagnosing a failure of a receiver by a base station in a radio system having silence periods in which wave transmission from a terminal is stopped and the base station measures external noise power, the base station has preset frequency information representing a frequency of diagnosing the receiver to a measurement frequency of external noise power, and diagnoses normality of the receiver by measuring external noise power only in one silence period out of plural silence periods, storing the measured external noise power and diagnosing normality of the receiver only during a later one of the plural silence periods on the basis of the frequency information and the stored external noise power.

17. The receiver failure diagnosing method according to claim 16, wherein the base station receives, from a maintenance terminal, wave transmission period information representing the length of a time for which the terminal transmits waves and silence period information representing the length of the silence period, and determines on the basis of the wave transmission period information and the silence period information whether the present time is a silence period or not.

18. The receiver failure diagnosing method according to claim 17, wherein the base station establishes time-synchronization with the terminal so that a timing at which the terminal stops the wave transmission according to the wave transmission period information and the silence period information from the maintenance terminal is coincident with a timing at which the controller determines that the present time is the silence period.

19. The receiver failure diagnosing method according to claim 16, wherein the base station adds a value of a counter every silence period, and determines on the basis of the frequency information and the value of the counter whether the silence period of the present time corresponds to a timing at which normality of the receiver is to be diagnosed or not.

20. The receiver failure diagnosing method according to claim 16, wherein the base station uses the external noise power stored in a storage unit, which stores external noise power measured during the only one silence period just before the later one silence period for which normality of the receiver is diagnosed, to calculate a dynamic range of a signal received from the terminal until the silence period for which the external noise power is next measured.

* * * * *